United States Patent
Venezia et al.

(10) Patent No.: US 10,289,708 B2
(45) Date of Patent: May 14, 2019

(54) MANAGEMENT OF UNIQUE IDENTIFIERS IN A DATABASE

(71) Applicant: Amadeus S.A.S., Biot (FR)

(72) Inventors: Alessandro Venezia, Antibes (FR); Thibault Devedeux, Antibes (FR); Samuel Burdese, Le Cannet (FR); Stefano Saraulli, Antibes (FR)

(73) Assignee: AMADEUS S.A.S., Biot (FR)

( * ) Notice: Subject to any disclaimer, the term of this patent is extended or adjusted under 35 U.S.C. 154(b) by 213 days.

(21) Appl. No.: 15/479,880

(22) Filed: Apr. 5, 2017

(65) Prior Publication Data

US 2018/0293260 A1 Oct. 11, 2018

(51) Int. Cl.
*G06F 17/30* (2006.01)

(52) U.S. Cl.
CPC .. *G06F 17/30303* (2013.01); *G06F 17/30292* (2013.01); *G06F 17/30324* (2013.01); *G06F 17/30504* (2013.01); *G06F 17/30607* (2013.01)

(58) Field of Classification Search
CPC ......... G06F 17/30303; G06F 17/30607; G06F 17/30324; G06F 17/30292; G06F 17/30504
See application file for complete search history.

(56) References Cited

U.S. PATENT DOCUMENTS

| | | | | |
|---|---|---|---|---|
| 5,909,688 A | * | 6/1999 | Yoshioka | G06F 17/30958 |
| 6,081,800 A | * | 6/2000 | Ozbutun | G06F 17/30324 |
| 9,798,754 B1 | * | 10/2017 | Shilane | G06F 17/30324 |
| 2005/0149472 A1 | * | 7/2005 | Schreter, IV | G06F 17/30324 |
| 2010/0138442 A1 | | 6/2010 | Shinkawa et al. | |
| 2013/0339297 A1 | * | 12/2013 | Chen | G06F 17/30581 707/624 |
| 2013/0339567 A1 | * | 12/2013 | Carpentier | G06F 11/0709 711/4 |
| 2015/0347589 A1 | | 12/2015 | Fontebride | |
| 2017/0262350 A1 | * | 9/2017 | Dornemann | G06F 11/1469 |

OTHER PUBLICATIONS

The National Industrial Property Institute, Preliminary Search Report issued in French Patent Application No. 1752977 dated Oct. 20, 2017.
Shi et al., "Object Identifier Reuse Mechanism for TOTEM", Proceedings of the 22nd International Conference on Data Engineering Workshops, p. 127, Apr. 3-7, 2006.

\* cited by examiner

*Primary Examiner* — Greta L Robinson
(74) *Attorney, Agent, or Firm* — Thompson Hine LLP

(57) ABSTRACT

Systems, methods, and computer program products for for associating a unique identifier with an object. The system may includes a database with a memory unit, an index unit, and a control pointer unit, at least one identifier management unit, and at least one update unit. A finite set of identifiers is organized in pages, and each page includes a bitmap representing the availability of the identifiers. The pointers to data in the index include a pointer to a last page loaded by an identifier management unit, and a pointer to a last page updated by an update unit.

15 Claims, 6 Drawing Sheets

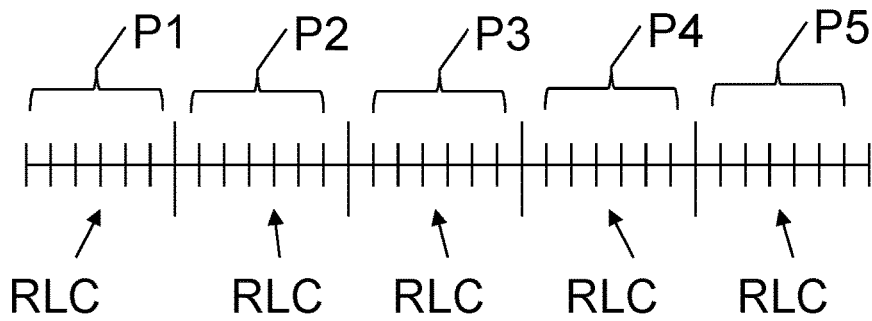
FIG. 2A
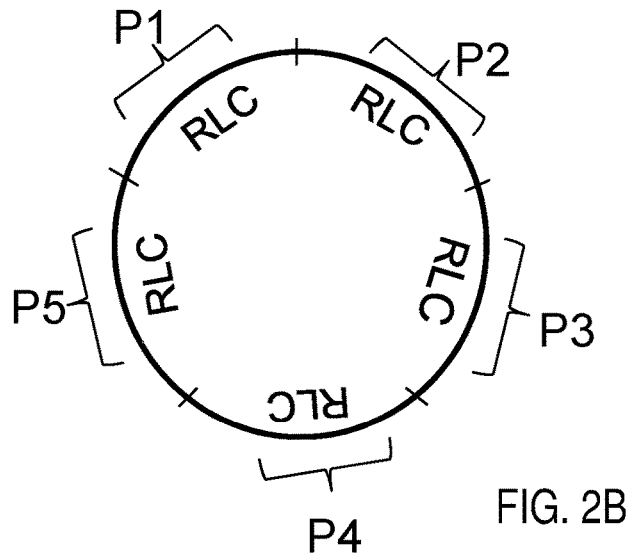
FIG. 2B
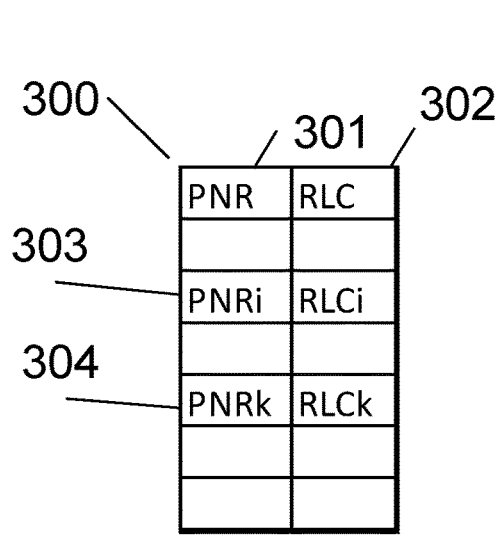
FIG. 3
| | Pg | BM |
|---|---|---|
| RLC | P1 | 01001......101 |
| | P2 | 11101......001 |
| | . | . |
| | . | . |
| | . | . |
| | . | . |
FIG. 4

MANAGEMENT OF UNIQUE IDENTIFIERS IN A DATABASE

TECHNICAL FIELD

The present invention relates to management of databases accessible on a large scale by a large number of clients with a high rate of updates and, more specifically, relates to the assignment of identifiers to objects stored in the database, the identifier associated with a given object being, at any given time, unique in the database.

BACKGROUND

In large-scale information systems, objects stored in a database are usually assigned an identifier consisting, for example, in an alphanumeric string of characters. The identifier may be used as means for identifying a given object with a data structure of limited size. By processing the identifier instead of the object itself, resources of the overall systems are optimized. Objects processed and stored in databases may not be static in essence. Objects may be created, deleted and modified at various rates. Therefore, the identifiers may also be created, deleted and modified correspondingly.

However, for databases processing a large amount of data accessed by a large number of clients, creating, deleting, modifying and also assigning identifiers may become a task that impacts the overall performance of the system. One example of a performance parameter that can be impacted is the response time. Other examples are the memory needed for storing the identifiers and their association with the corresponding objects and the communication bandwidth for updating the identifiers and their correspondences.

In some applications, each object is assigned a unique identifier that represents the object in a unique fashion throughout the system. A field in which the use of unique identifiers in a database may be important is the management of travel reservations.

Travel companies such as airline companies and hotel companies for example use very sophisticated databases and reservation software for handling reservations by customers. A travel reservation involves a large number of participants: commercial agents, transportation companies, customs and other administrative bodies, etc. These participants are also usually distributed over large geographical regions. Therefore, a common database and communication architecture must be used to endure a proper management of the large amount of information that the travel specifications of each reservation by each customer represent. The common database is thus accessed by a large number of client devices (at the travel companies) simultaneously, and from a large number of locations.

TPF (acronym for "Transaction Processing Facility") is an example of a real-time operating system developed by IBM™ for processing data transactions involved in travel reservation systems. Other systems exist, as would be understood by the person skilled in the art.

In order to share information concerning a given reservation, the travel industry has developed common descriptors and data structures to be used in the data transaction-processing systems. Historically, the airline industry defined the PNR (acronym for "Passenger Name Record") which is a record in a database that contains information (including reservation information) concerning a traveller or a group of travellers travelling together. The purpose of the PNR was to make it possible for airline companies to exchange reservation information in case the travel involved several airlines for several destinations. IATA (acronym for "International Air Transportation Association"), the trade association regrouping the airline companies throughout the world, is the body that defines the standard for the PNR (content, format, etc.). Although PNRs had initially been defined for the airline industry, they are also used for hotel reservation, car rental, train bookings, etc.

In order to facilitate access to the PNRs, unique identifiers are associated with the PNRs. The unique identifiers are usually called "record locators" but other denominations exist. The record locators are typically defined as an alphanumeric string of characters, for example 6 characters (numbers and letters). The use of an alphanumeric string is the current standard in the industry.

The management of record locators must meet a large number of technical constraints. The following are exemplary constraints. One constraint is a high throughput, for example, more than 50 identifier requests per second. Another constraint is a low response delay, for example at least 90% of the identifier requests to be processed in less than a millisecond. Another constraint is being reliably uniquely associated with an active PNR at a given time and avoiding failure due to identification conflicts. Another constraint is being reusable once a previous use of the identifier is exhausted. Another constraint is guaranteeing the avoidance of "lost" identifiers, for example identifiers assigned to an inactive PNR without possibility to recover the identifier (e.g., for reuse). Another constraint is simplicity of operation and avoidance of manual interventions. Another constraint is respect of the communication constraints of the architecture of the system (messaging constraints and the like). Another constraint is being interoperable between transaction data processing systems (e.g., TPF developed by IBM™ and other systems). Another constraint is to respect standardization constraints.

To cope with such constraints, there is a need for an evolution from centralized mainframes to distributed systems wherein independent and redundant servers (called "backends") can simultaneously and independently perform allocations of record locators for newly created reservation records. In some centralized mainframes, the record locators not only serve as identifiers for the PNRs but they also serve as a low-level address in the database. In order to generate the record locators, the centralized systems implement algorithms that can convert an address in the database into a record locator compliant with the standard. Such generation method for unique identifiers is not convenient for distributed architectures. The address-based generation cannot be implemented in each backend without an increase of the complexity of the system while keeping the constraints on the identifiers met (short size with a restricted number of characters, high performance, compatibility, etc.).

Thus, there is a need for improvements of unique identifier generation for database systems.

SUMMARY

According to embodiments of the invention, there is provided a system for associating identifiers with objects represented in the system, wherein, at a given time, a given object represented in a database of the system is associated with a unique identifier. The system includes a database with a memory unit configured to store the objects and their respective associations with the identifiers, and an index unit configured to store an availability status of the identifiers of the system. The system further includes a control pointer unit that is configured to store pointers to data in the index unit, at least one identifier management unit that is configured to access the database, and at least one update unit configured to update the availability status of the identifiers of the system. The identifiers belong to a finite set of identifiers organized, within the index unit, according to identifier pages, each page is represented by a bitmap, each bit of the bitmap corresponds to a respective identifier value, and each bit value corresponds to the availability of the corresponding identifier. The pointers to data in the index comprise at least a first pointer to a last page loaded by an identifier management unit of the system, and a second pointer to a last page updated by an update unit of the system. The at least one identifier management unit is further configured to load a first identifier page, based on the first pointer for allocating an identifier of the identifier page to an object to be stored in the database, based on a bitmap corresponding to the first loaded page. The at least one update unit is further configured to determine identifiers corresponding to a second identifier page based on the second pointer, access the memory unit to check availability of the determined identifiers, and update a bitmap representing the second loaded page based on availability of the determined identifiers. The database is further configured to store, in the memory unit, an object and its allocated identifier upon its activation in the system, and delete, from the memory unit, an object and its allocated identifier upon its deactivation in the system.

Embodiments provide a short time response while keeping the complexity of implementation low. Embodiments also provide compatibility with existing databases.

According to embodiments, the at least one identifier management unit is further configured to discard the loaded first identifier page, after a duration not exceeding a maximum page lifetime duration.

According to embodiments, the at least one update unit is further configured to wait for the maximum page lifetime duration before determining an identifier corresponding to the second identifier page.

According to embodiments, at least one of an identifier management unit and an update unit is further configured to check whether the first pointer and the second pointer concurrently point to a same identifier page.

According to embodiments, the identifier pages are ordered in a cyclic fashion.

According to embodiments, before allocating an identifier to an object to be stored in the database, the pointers are checked to verify that the second pointer is not pointing to the identifier page next to the one to which points the first pointer. For example, the pointers may be checked each time a page is loaded.

According to embodiments, before updating a bitmap of an identifier page, the pointers are checked to verify that the first pointer is not pointing to the identifier page next to the one to which points the second pointer.

According to embodiments of the invention, there is provided a method for associating identifiers with objects represented in a system, wherein, at a given time, a given object represented in a database of the system is associated with a unique identifier. The system includes a database with a memory unit configured to store the objects and their respective associations with the identifiers, an index unit configured to store an availability status of the identifiers of the system, and a control pointer unit configured to store pointers to data in the index unit. The system further includes at least one identifier management unit configured to access the database, and at least one update unit configured to update the availability status of the identifiers in the system. The identifiers belong to a finite set of identifiers organized, within the index unit, according to identifier pages, each page is represented by a bitmap, each bit of the bitmap corresponds to a respective identifier value, and each bit value corresponds to the availability of the corresponding identifier. The pointers to data in the index include at least a first pointer to a last page loaded by an identifier management unit of the system, and a second pointer to a last page updated by an update unit of the system. The method includes, performed by the at least one identifier management unit, loading a first identifier page based on the first pointer, and allocating an identifier of the identifier page to an object to be stored in the database based on a bitmap corresponding to the first loaded page. The method further includes, performed by the at least one update unit, determining identifiers corresponding to a second identifier page based on the second pointer, accessing the memory unit to check availability of the determined identifiers, and updating a bitmap representing the second loaded page based on availability of the determined identifiers. The method further includes, performed by the database, storing, in the memory unit, an object and its allocated identifier upon its activation in the system, and deleting, from the memory unit, an object and its allocated identifier upon its deactivation in the system.

According to embodiments, the at least one identifier management unit further discards the loaded first identifier page, after a duration not exceeding a maximum page lifetime duration.

According to embodiments, the at least one update unit further waits for the maximum page lifetime duration before determining identifier corresponding to the second identifier page.

According to embodiments, at least one of an identifier management unit and an update unit further checks whether the first pointer and the second pointer concurrently point to a same identifier page.

According to embodiments, the identifier pages are ordered in a cyclic fashion.

According to embodiments, before allocating an identifier to an object to be stored in the database, the pointers are checked to verify that the second pointer is not pointing to the identifier page next to the one to which points the first pointer.

According to embodiments, before updating a bitmap of an identifier page, the pointers are checked to verify that the first pointer is not pointing to the identifier page next to the one to which points the second pointer.

According to a third aspect of the invention there is provided computer program product comprising instructions for implementing a method according to the second aspect of the invention when the program is loaded and executed by a programmable apparatus.

There is also provided a non-transitory information storage medium readable by a computer or a microprocessor and storing instructions of a computer program, for implementing a method according to embodiments of the invention, when the program is loaded and executed by the computer or microprocessor.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

Embodiments of the present invention will be understood and appreciated more fully from the following detailed description taken in conjunction with the drawings.

FIGS. 2A and 2B illustrate Record locators according to embodiments.

FIG. 3 schematically illustrates a table representing PNRs according to embodiments.

FIG. 4 schematically illustrates an index table according to embodiments.

DETAILED DESCRIPTION

Figure 1:
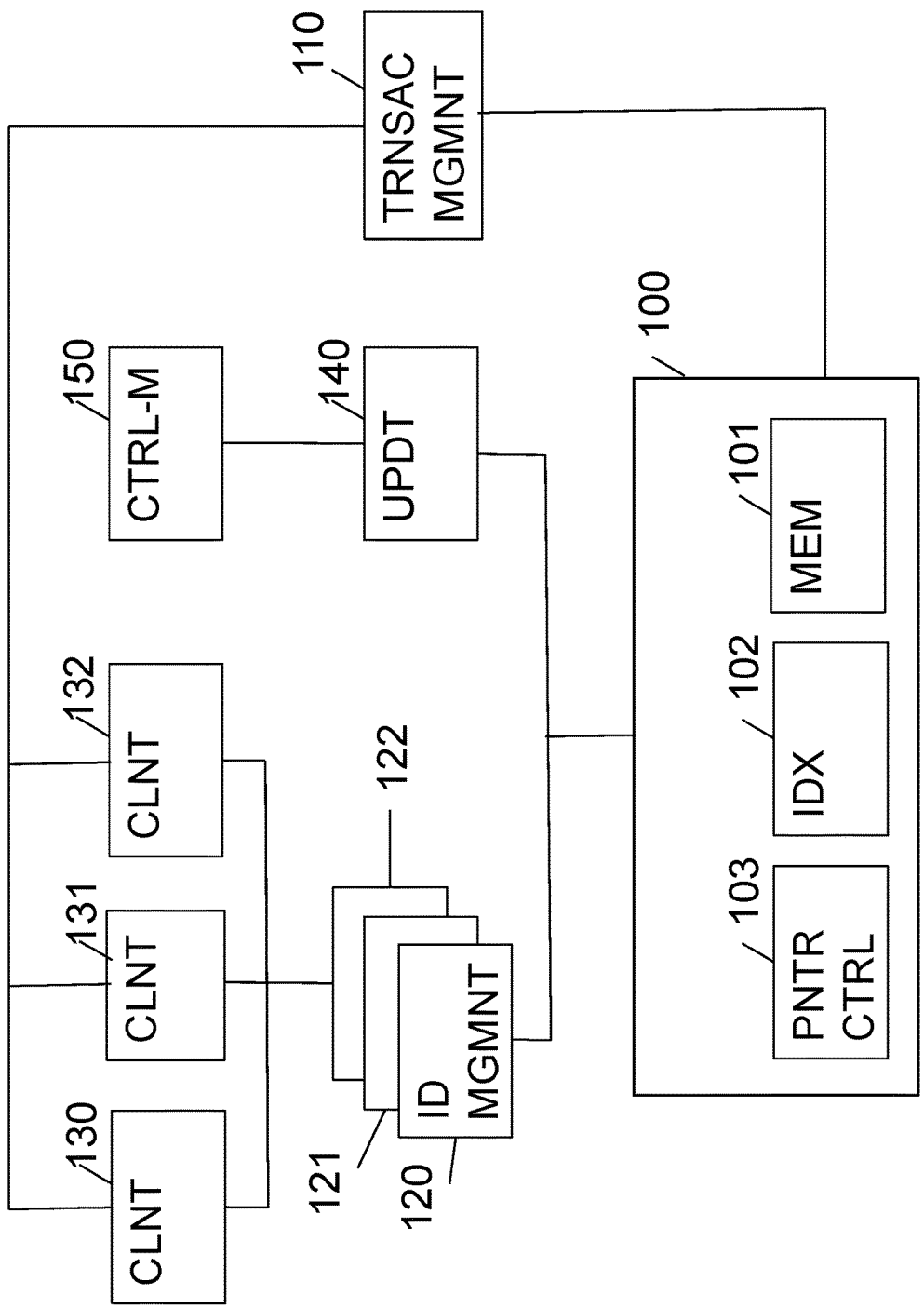
FIG. 1 illustrates a general context of implementation of embodiments.

FIG. 1 illustrates a general context of implementation of embodiments. A database system 100 is provided for storing objects that can be placed and retrieved by a plurality of external devices. The database system may be implemented as a relational database or an object-relational database management system (ORDBMS). For example, the ORDBMS may be a system as marketed by Oracle Corporation™. For example, the database system 100 may store PNRs created by travel agencies computer implemented management systems.

The database comprises a memory unit 101 for storing the objects (such as the PNRs) and their association with a unique identifier. The unique identifier may be a record locator for example. According to embodiments, memory unit 101 stores only objects that are active in the overall system. In the case of a PNR, memory unit 101 will only have in memory PNRs that are active. Therefore, as soon as a PNR is no longer needed (for example the travel it represented is terminated), it is removed from memory unit 101. The object may be erased or deactivated according to any other mechanism. Such mechanism may be performed by an external PNR removal unit (not represented). Actions by the PNR removal unit may be triggered by control unit 150 described hereinafter.

The fact that memory unit 101 comprises only active objects makes it possible to determine, from the association between an object and its unique identifier, whether a unique identifier is available or not for assignment to another object. In other words, since memory unit 101 comprises only active objects, it may be inferred that as soon as a unique identifier is associated with an object in memory unit 101, it is not available for another object.

The database system 100 further comprises an index unit 102. Index unit 102 comprises a summary of the availability status of all unique identifiers in the system. Each unique identifier of the system is marked as available or not available in index unit 102. The database system 100 further comprises a control pointer unit 103. Control pointer unit 103 comprises pointers to data in the index unit 102. The database system 100 is further connected through a communication network (not represented) to several devices that can read and/or write data in and/or from the database system. The communication network is an Internet Protocol based network for example.

Transaction management unit 110 is a processing unit connected to the database system 100 in charge of updating it as regards the objects stored therein. Upon request of a client device, it creates the object to be stored in the memory unit 101, based on information provided by the client device (including the unique identifier to be associated with it). Transaction management unit 110 also transmits the objects created to the management database system for storage into memory unit 101. Transaction management unit 110 may also be involved in the deletion and/or modification of objects in the memory unit 101 of database system 100.

The unique identifiers are provided to the client devices though one or more identifier management units 120, 121, 122 connected to the database system 100. Identifier management units are independent units 120, 121, 122 ("backends") that can independently have access to the database system 100 to read data. Identifier management units 120, 121, 122 ("backends") can also be independently accessed by one or more client devices 130, 131, 132 in order to obtain unique identifiers.

Synchronization of the use of the unique identifiers is performed through an update unit 140 connected to the database system 100. According to a general goal of the overall system, at a given time, one unique identifier should not be assigned to more than one active object. In case an identifier is associated with two or more active objects, an error occurred in the system. According to embodiments, an identifier may be present in the system without being associated with an object (like a reservation): for example, in a case in which it is intentionally filtered out (e.g., the identifier represents a bad word or the active object is not officially yet in the system).

In an exemplary embodiment, update unit 140 refreshes the availability status of the unique identifiers in a batch mode. Update of the unique identifier availability status may be managed by a control unit 150 connected to the update unit 140. Control unit 150 may be implemented using Control-M™ workload automation software by BMC Software™.

In the above-described general context of implementation of embodiments, the client devices 130, 131, 132 are connected to the identifier management units 120, 121, 122 to obtain unique identifiers to be associated with objects to be stored in the database system. The client devices 130, 131, 132 are also connected to the transaction management unit 110 for the creation of the objects based on information provided by the client devices and for the storage of the objects in the database system 100 in association with the unique identifiers.

In what follows, the example of a travel management system will be described. The invention is however not limited to this type of applications. Embodiments have other types of applications, in systems wherein objects are to be associated with unique identifiers and wherein the number of available unique identifiers is limited.

In what follows, the unique identifiers may be referred to as "record locators", "recloc" or "rloc". The objects may be referred to as "PNRs". The database system may be referred to as the acronym "RDBMS".

Record locators according to embodiments are described with reference to FIGS. 2A and 2B. Record locators are represented by a finite number of integer numbers "RLC".

For example, they are expressed in base 34 left-padded to fit 6 characters. Therefore: $0_{10}=222\ 222_{34}$, $1_{10}=222\ 223_{34}$ ... up to $ZZZ\ ZZZ_{34}$.

The finite set of record locators is logically divided into pages P1, ..., P5. Each page may comprise a same number of record locators. They may also comprise different numbers of record locators. For example, each page comprises 16000 record locators. The pages may be sequentially numbered. Also, for example, the pages may be adjacent, that is to say, one page comprises successive record locators. Alternatively, the pages may comprise non-adjacent record locators. In the database system, some operations may process entire pages. Other operations, outside the database system, may process single record locators.

Each record locator may be associated with a value that represents its availability in the system. For example a bit status having a value "1" when the record locator is available and "0" when it is not available.

In FIG. 2A, the record locators are represented on a finite segment, for example from 222 222 to ZZZ ZZZ. However, according to embodiments, the record locators are represented as cyclic values like in FIG. 2B. The record locators are of limited number and there is a "rollover": when "going past" the biggest number, the count restarts from the first number. In other words, the resource locators satisfy the following relation ZZZ ZZZ+222 223=222 222. The record locator next to the last one is the first one. Therefore, the record locators are limited in number, ordered in a cyclic fashion and classified according to pages. They also have a usage characterization for indicating whether they are available or not.

FIG. 3 schematically illustrates the table representing the PNRs in memory unit 101. The table 300 has a column 301 storing the PNRs. For example, only the PNRs active in the system are stored in the table. Alternatively, a data structure may be used to differentiate between active and non-active PNRs. A column 302 of the table 300 stores the record locators. Since the table contains only active PNRs, the record locators in the table are therefore in use and not available. In case the table differentiates between active and non-active PNRs, the differentiation also applies to the record locators. Therefore, in each line 303, 304 of the table, a PNR is uniquely associated with a unique record locator.

FIG. 4 schematically illustrates the index table 400 representing the summary (stored in unit 102) of the availability status of the record locators in the memory unit 101. The record locators are represented according to a circular buffer. Column 401 comprises the pages ("Pg") of record locators. Column 402 comprises a bitmap ("BM") associated with the corresponding page in column 401 representing the availability status of each record locator in the page.

Value "1" represents a record locator which is available. Value "0" represents a record locators which is in use and not available. Stated otherwise, a record locator that is present in the memory unit 101 as associated with an active PNR is represented by a value "0" in the bitmap corresponding to the page to which it belongs. In case the record locator is absent from the memory unit 101, it is represented by "1".

In each bitmap of column 401, a record locator has the position it has in the page to which it belongs. Stated otherwise, the first bit of the bitmap corresponds to the lowest record locator in the page, the last corresponds to the highest record locator in the page.

According to embodiments, for a given page represented in the index table 400, all the record locators are used. This means that all the bits of the bitmaps are meaningful. Nevertheless, during the allocation process, the identifier management units 120, 121, 122 can skip some of the bits if the corresponding record locators are contained in a table of the memory unit 101 (or any similar storage system). Thus, the table may contain record locators that the system must not generate for technical and/or functional reasons.

Figure 5A:
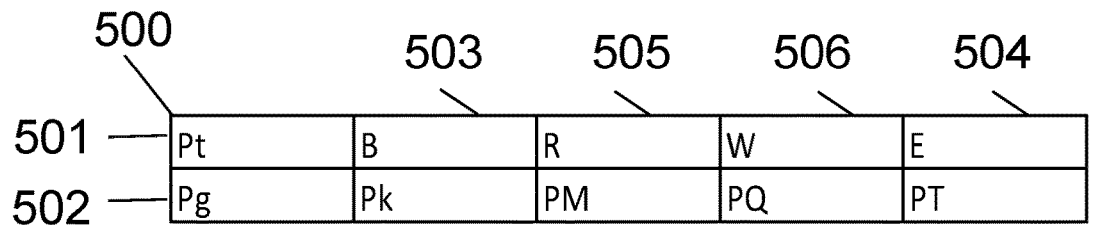
FIGS. 5A and 5B schematically illustrate a table stored in the Control pointer unit according to embodiments.
Figure 5B:
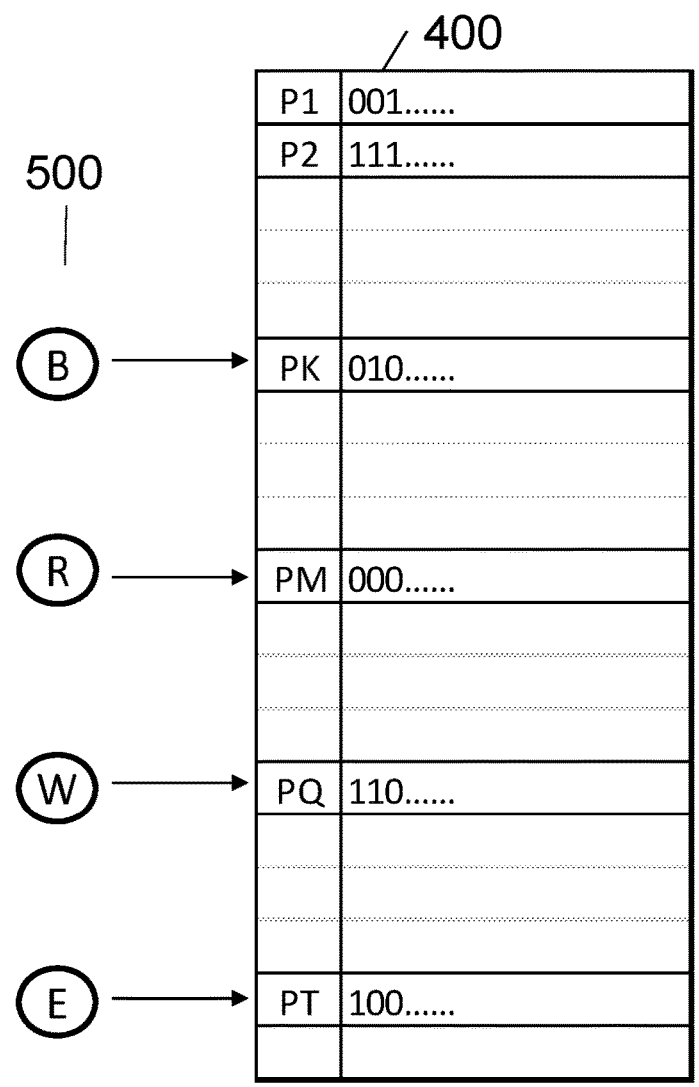

FIGS. 5A and 5B schematically illustrate the table 500 stored in the Control pointer unit 103. Table 500 stores pointers to pages in the index table 400. Row 501 represents the pointers to specific pages stored in the index table 400. Row 502 represent these specific pages.

In some implementations, table 500 may have different row for different record locator ranges. The organization of table 500 with rows and columns as represented in FIG. 5A allows for such addition of row and such implementations.

Pointers 503 ("B" for "Begin") points to the first page comprising authorized record locators in the system. This means that record locators belonging to a page ranked between the page with the lowest number and the page to which points pointer B cannot be used. In case the pages comprise successive values, this means that record locators having a value inferior to the value of the first record locator in the page to which points pointer B cannot be used.

Pointer 504 ("E" for "End") points to the page after the last page comprising authorized record locators in the system. This means that record locators belonging to a page ranked between the page to which points pointer E and the page with the highest number or belonging to the page to which points pointer E cannot be used. In case the pages comprise successive values, this means that record locators having a value superior or equal to the value of the first record locator in the page to which points pointer E cannot be used.

Pointer 505 ("R" for "Read") points to the last page loaded by an identifier management unit 120, 121, 122. Pointer 506 ("W" for "Write") points to the page just after the last page updated by update unit 140.

As described in what follows, the identifier management units read the record locators on a page per page basis. The unique identifier management units load an entire page for one or more given client devices which will be allowed to use available record locators of the loaded page.

Control rules are implemented that provide that pointers R and W never point to the same page at the same time. For example, these control rules may be implemented by the identifier management units 120, 121, 122. They may also be implemented by the update unit 140. Also, the rules provide that the page to which pointer R points is in use (or loaded) by a unique identifier management unit.

The pointers are checked to determine whether the following relation is true: R+1=W. This may be checked regularly. This may also be checked each time a page is loaded. In case the page to which points pointer R is the page immediately before the one to which points pointer W, this means that there is no page with record locators available. PNRs cannot be created (or used) until PNRs are deactivated and the update management unit updates the pages with the corresponding record locators.

The pointers are also checked to determine whether the following relation is true: W+1=R. In case the page to which points pointer W is the page immediately before the one to which points pointer R, this means that all pages are up to date. It can therefore be determined that there is no need for an update by update unit 140.

Figure 6:
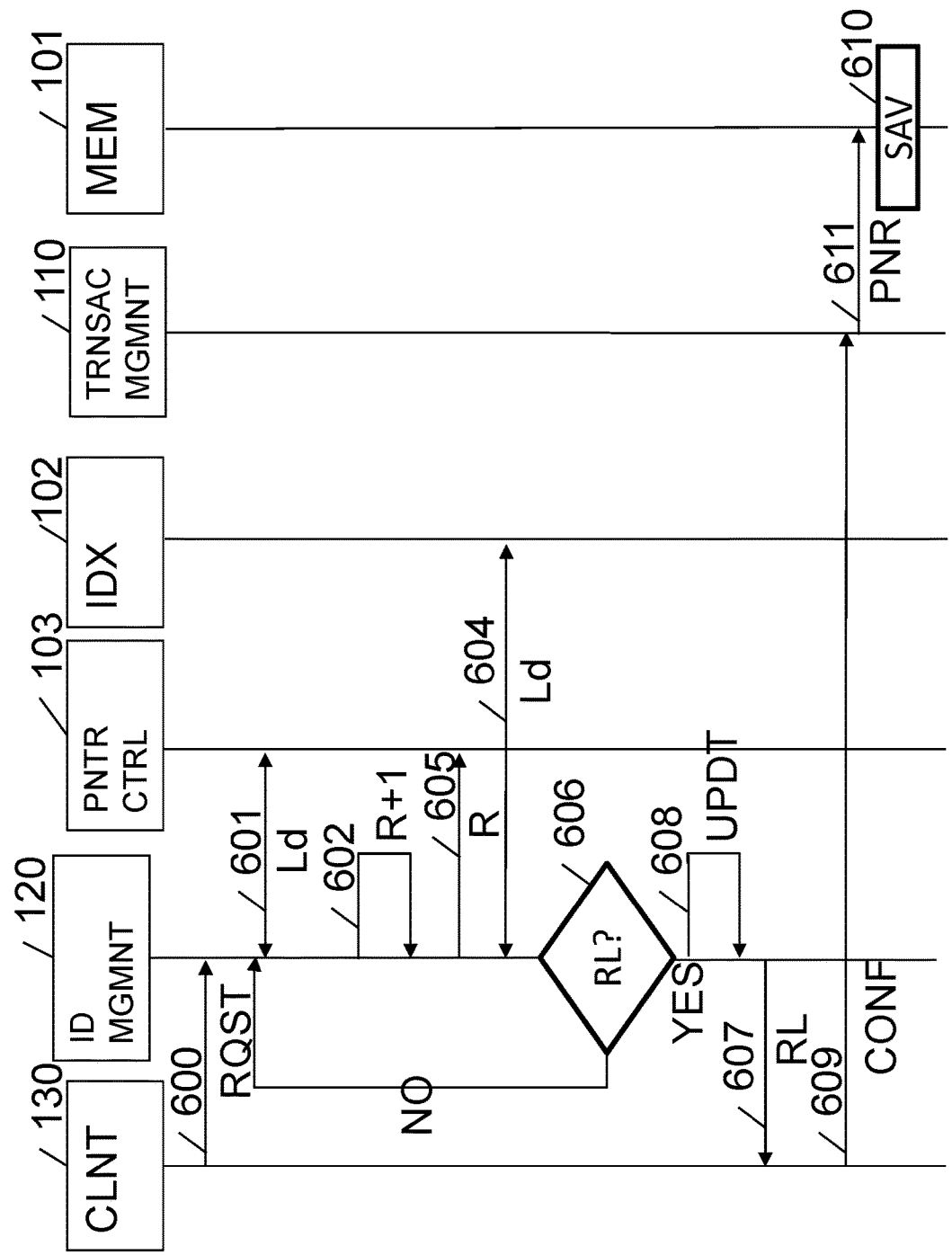
FIG. 6 is a dataflow for the allocation of a record locator to a client device according to embodiments.

FIG. 6 is a dataflow illustrating the allocation of a record locator to a client device. In a first block 600, a client device 130 requests a record locator to a unique identifier management unit 120. Next, in block 601, the unique identifier management unit 120 loads the pointer value of pointer 505 ("R") from Control pointer unit 103. The unique identifier management unit 120 then increments the pointer value in block 602. The pointer value is not actually directly loaded from the Control pointer unit. A "read" request is addressed to the database system which performs the processing needed to read the values from the Control pointer unit and to send them back to the unique identifier management unit. The dataflow is simplified for the sake of clarity and conciseness.

The unique identifier management unit 120 stores the incremented value in the Control pointer unit 103 in block 605. In block 604, the unique identifier management unit 120 loads the page in index unit 102 corresponding to pointer 505 (after increment).

The database systems implements concurrency control rules that make it possible to guarantee that the load, increment and store of the value of pointer R are atomic, i.e., the same page cannot be read by two different unique identifier management units. As an example, these control rules are guaranteed by the "ACID" (acronym for "Atomicity, Consistency, Isolation, Durability") properties of relational database transactions.

In case there is no page available, the system returns an error (not represented).

The first page may be loaded by the unique identifier management unit 120 at startup. Alternatively, the first load of a page may be carried out upon the first request received. The identifier management unit will keep the loaded page in memory during a given period of time or until the page has no more record locators available in it. For example, in a travel management system, the lifetime of a loaded page may be 12 minutes.

The unique identifier management unit 120 checks whether it can keep a loaded page in memory each time it accesses the page itself (for finding an available record locator for the client device). When a duration called "page lifetime" corresponding to a page consultation period elapses or when it does not have any more record locators available (block 606, NO), the unique identifier management unit 120 immediately reloads another page (blocks 601 to 605).

The unique identifier management unit 120 may also reload a page (after checking the above conditions) after having allocated a record locator to a client device. Loading a whole page, rather than a single record locator, makes it possible to guarantee that most of the requests can be satisfied without accessing the database. Testing the page status after replying to the last client device, but before accepting the next request by a client device, keeps the response time short (page loading takes place "in between" rather than "during" the processing of requests).

Once the unique identifier management unit 120 has a valid page in memory, it looks for an available record locator in it in block 606 and returns it (YES) to the client device 130 in block 607. The unique identifier management unit 120 updates the availability status of the record locator in the page it has loaded in block 608. The unique identifier management unit 120 does not directly update index unit 102 (to avoid database accesses and thereby increasing performance).

The system makes it possible to guarantee that no other unique identifier management unit can read the (now out-of-date) page in the database before the update unit 140 has refreshed the information in it.

The process does not end, unless the unique identifier management units are switched off by an operator. They keep answering queries by client devices.

If the PNR creation completes, its data is stored in memory unit 101 in block 610. The client device 130 confirms the creation of the PNR with the associated record locator it retrieved from the unique identifier management unique and sends the corresponding data to the Transaction management unit 110 (block 609). Then, the Transaction management unit sends the data to the database in block 611 and the storage is performed in block 610

In the above process, the pages pointed to by pointers R and W are certainly different, therefore the database write cannot happen on a record locator being currently read by the update unit 140. This guarantees the correctness of the access to the database by the update unit 140, even if it does not lock the PNRs.

Figure 7:
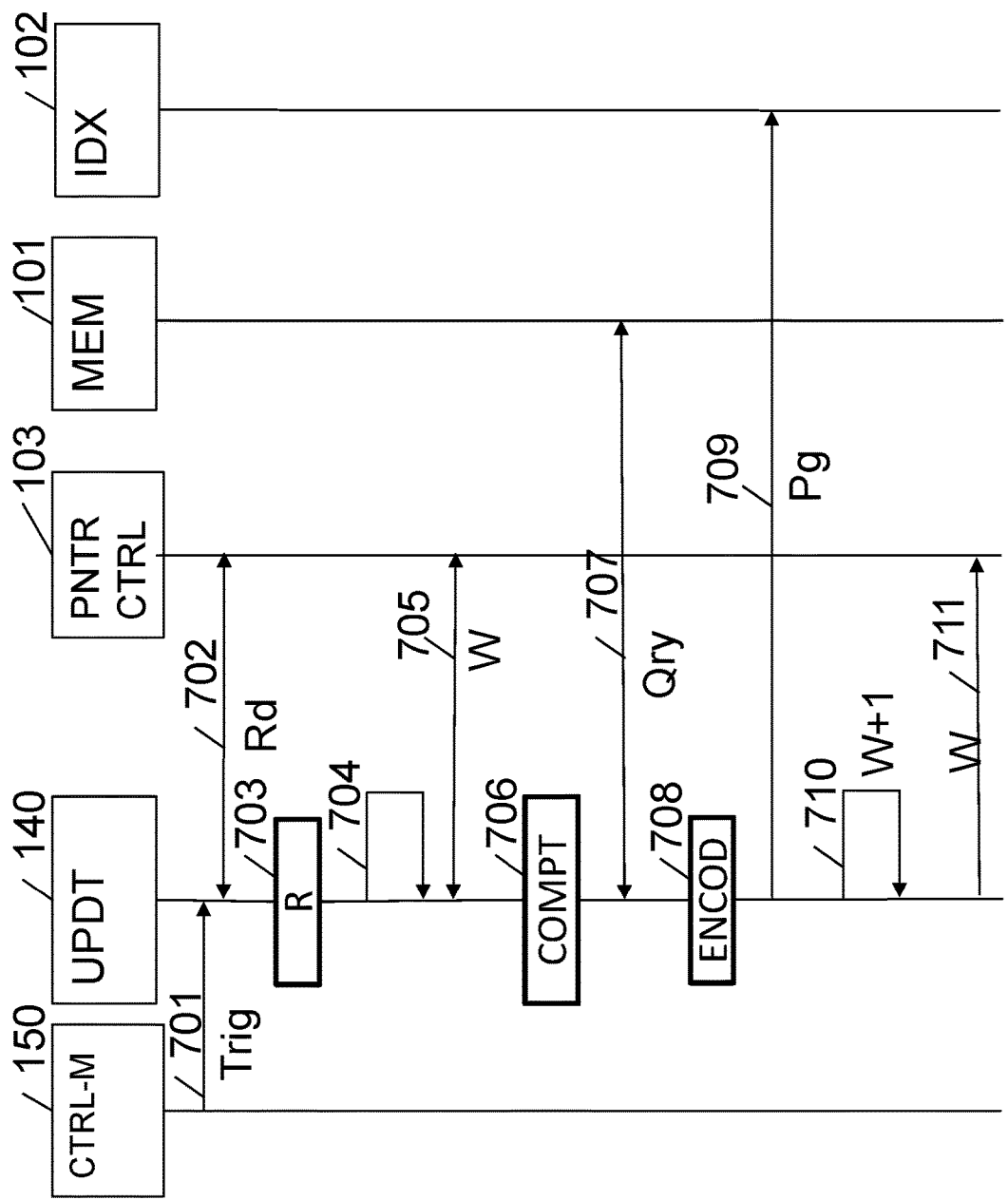
FIG. 7 is a dataflow for updating the database system according to embodiments.

FIG. 7 is a dataflow for updating the database system according to the allocation of record locators to PNRs. The update is performed by the update unit 140 independently from the operations of the unique identifier management units 120, 121, 122. The update is triggered by control unit 150 in block 701. The update unit 140 then reads, in block 702, the values of pointers 503 to 506 (B, R, W, E) from Control pointer unit 103. The read request is not actually directly addressed to the Control pointer unit. The read request goes to the database system which performs the processing needed to read the values from the Control pointer unit and to send them back to the update unit. The dataflow is simplified for the sake of clarity and conciseness.

After startup, the update unit stores the initial value of pointer R in block 703. Then, it waits a duration called "page lifetime" (corresponding to a page consultation period) in block 704. The page duration time is the same as the duration for the unique identifier management unit to keep the pages. In block 704, it possible to guarantee that any page loaded in memory by a unique identifier management unit has certainly been used or discarded. Then, the update unit loads the value of pointer W from the Control pointer unit in block 705 and computes the block of record locators contained in the corresponding page in block 706. The update unit then queries the database system about the availability status of these record locators in block 707. The update unit checks whether the record locators are stored in memory unit 101 comprising the active PNRs. By using one query per page, the update unit loads information for a large number of record locators at a time, thereby reducing the database traffic and the impact of network latency.

Once the data is returned by the database system, the update unit encodes it in the page (block 708) and stores it in the index unit 102 of the database (block 709). Finally the update unit increments the value of pointer W in block 710. The incremented value of pointer W is then stored in the Control pointer unit 103 in block 711. The above process then loops to process another page.

The update unit regularly checks, at each implementation of the process of FIG. 7, whether the value W reaches the value of pointer R as stored (in block 703) before waiting in block 704 because pages after this point may still be in use by online nodes.

Figure 8:
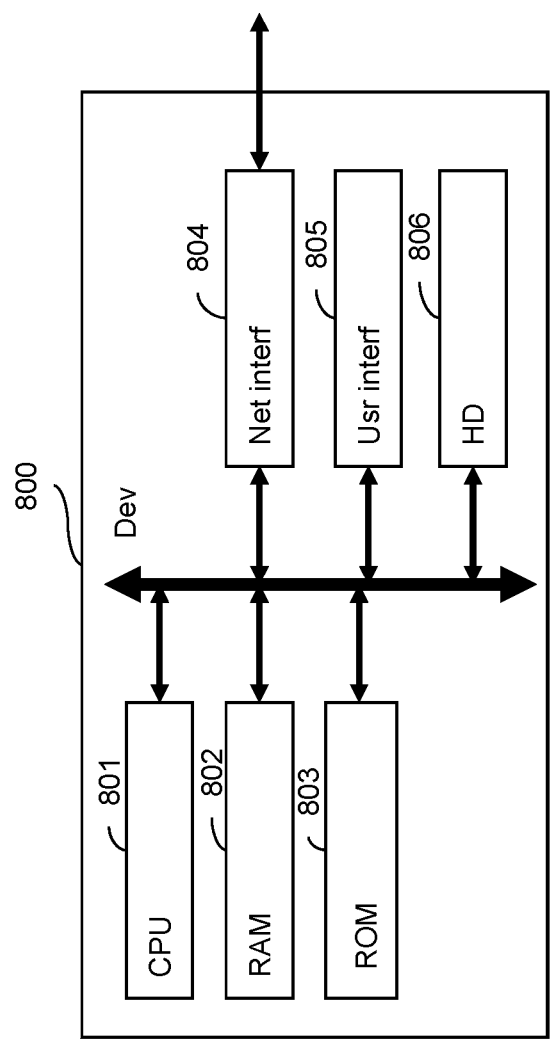
FIG. 8 schematically illustrates a device according to embodiments.

FIG. 8 is a schematic block diagram of a device 800 for implementing of one or more embodiments of the invention. The various parts of the system described above may have a same structure as device 800. The device 800 includes a communication bus connected to a central processing unit 801, such as a microprocessor, denoted CPU, a random access memory 802, denoted RAM, for storing the executable code of the method of embodiments of the invention, and the registers adapted to record variables and parameters necessary for implementing a method according to embodiments. The memory capacity thereof can be expanded by an optional RAM connected to an expansion port, for example, a read only memory 803, denoted ROM, for storing computer programs for implementing embodiments of the invention, a network interface 804, which is typically connected to a communication network over which digital data to be processed are transmitted or received. The network interface 804 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 801. The device 800 further includes a user interface 805 for receiving inputs from a user or to display information to a user, a hard disk 806 denoted HD, and an I/O module 807 for receiving/sending data from/to external devices such as a video source or display.

The executable code may be stored either in read only memory 803, on the hard disk 806 or on a removable digital medium such as for example a disk. According to a variant, the executable code of the programs can be received by means of a communication network, via the network interface 804, in order to be stored in one of the storage means of the communication device 800, such as the hard disk 806, before being executed.

The central processing unit 801 is adapted to control and direct the execution of the instructions or portions of software code of the program or programs according to embodiments of the invention, which instructions are stored in one of the aforementioned storage means. After powering on, the CPU 801 is capable of executing instructions from main RAM memory 802 relating to a software application after those instructions have been loaded from the program ROM 803 or the hard-disk (HD) 806 for example. Such a software application, when executed by the CPU 801, causes methods according to embodiments to be performed.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for associating identifiers with objects represented in the system, a given object represented in a database of the system is associated, at a given time, with a unique identifier, the system comprising:
    a database including a memory unit configured to store the objects and their respective associations with the identifiers, an index unit configured to store an availability status of the identifiers of the system, and a control pointer unit configured to store pointers to data in the index unit;
    at least one identifier management unit configured to access the database; and
    at least one update unit configured to update the availability status of the identifiers of the system,
    wherein the identifiers belong to a finite set of identifiers organized, within the index unit, according to identifier pages, each page being represented by a bitmap, each bit of the bitmap corresponds to a respective identifier value, each bit value corresponds to the availability of the corresponding identifier, and the pointers to data in the index comprise at least a first pointer to a last page loaded by an identifier management unit of the system, and a second pointer to a last page updated by an update unit of the system, and
    wherein the at least one identifier management unit is further configured to load a first identifier page, based on the first pointer for allocating an identifier of the identifier page to an object to be stored in the database, based on a bitmap corresponding to the first loaded page, and
    wherein the at least one update unit is further configured to determine identifiers corresponding to a second identifier page based on the second pointer, access the memory unit to check availability of the determined identifiers, and update a bitmap representing the second loaded page based on availability of the determined identifiers, and
    wherein the database is further configured to store, in the memory unit, an object and its allocated identifier upon its activation in the system, and delete, from the memory unit, an object and its allocated identifier upon its deactivation in the system.

2. The system of claim 1 wherein the at least one identifier management unit is further configured to discard the loaded first identifier page after a duration that is less than or equal to a maximum page lifetime duration.

3. The system of claim 2 wherein the at least one update unit is further configured to wait for the maximum page lifetime duration before determining an identifier corresponding to the second identifier page.

4. The system of claim 1 wherein at least one of the identifier management unit and the update unit is further configured to check whether the first pointer and the second pointer concurrently point to a same identifier page.

5. The system of claim 1 wherein the identifier pages are ordered in a cyclic fashion.

6. The system of claim 5 wherein, before allocating an identifier to an object to be stored in the database, the system checks the pointers to verify that the second pointer is not pointing to the identifier page next to the one to which points the first pointer.

7. The system of claim 5 wherein before updating a bitmap of an identifier page, the system checks the pointers to verify that the first pointer is not pointing to the identifier page next to the one to which points to the second pointer.

8. A method for associating identifiers with objects represented in a system, wherein, at a given time, a given object represented in a database of the system is associated with a unique identifier, wherein the system includes a database with a memory unit configured to store the objects and their respective associations with the identifiers, an index unit configured to store an availability status of the identifiers of the system, and a control pointer unit configured to store pointers to data in the index unit, at least one identifier management unit configured to access the database, and at least one update unit configured to update the availability status of the identifiers in the system, the identifiers belong to a finite set of identifiers organized, within the index unit, according to identifier pages, each page is represented by a bitmap, each bit of the bitmap corresponds to a respective identifier value, and each bit value corresponds to the availability of the corresponding identifier, and the pointers to data in the index comprise at least a first pointer to a last page loaded by an identifier management unit of the system, and a second pointer to a last page updated by an update unit of the system, the method comprising:
    loading, by the at least one identifier management unit, a first identifier page, based on the first pointer;
    allocating, by the at least one identifier management unit, an identifier of the identifier page to an object to be stored in the database, based on a bitmap corresponding to the first loaded page;
    determining, by the at least one update unit, identifiers corresponding to a second identifier page based on the second pointer;
    accessing, by the at least one update unit, the memory unit to check availability of the determined identifiers;
    updating, by the at least one update unit, a bitmap representing the second loaded page based on availability of the determined identifiers;
    storing, by the database in the memory unit, an object and its allocated identifier upon its activation in the system; and
    deleting, by the database from the memory unit, an object and its allocated identifier upon its deactivation in the system.

9. The method of claim 8 comprising:
discarding, by the at least one identifier management unit, the loaded first identifier page, after a duration not exceeding a maximum page lifetime duration.

10. The method of claim 9 comprising:
waiting, by the at least one update unit, for the maximum page lifetime duration before determining an identifier corresponding to the second identifier page.

11. The method of claim 8 comprising:
checking, by at least one of an identifier management unit and an update unit, whether the first pointer and the second pointer concurrently point to a same identifier page.

12. The method of claim 8 wherein the identifier pages are ordered in a cyclic fashion.

13. The method of claim 12 further comprising:
before allocating an identifier to an object to be stored in the database, checking the pointers to verify that the second pointer is not pointing to the identifier page next to the one to which points the first pointer.

14. The method of claim 12 further comprising:
before updating a bitmap of an identifier page, checking the pointers to verify that the first pointer is not pointing to the identifier page next to the one to which points to the second pointer.

15. A computer program product for associating identifiers with objects represented in a system, wherein, at a given time, a given object represented in a database of the system is associated with a unique identifier, wherein the system includes a database with a memory unit configured to store the objects and their respective associations with the identifiers, an index unit configured to store an availability status of the identifiers of the system, and a control pointer unit configured to store pointers to data in the index unit, at least one identifier management unit configured to access the database, and at least one update unit configured to update the availability status of the identifiers in the system, the identifiers belong to a finite set of identifiers organized, within the index unit, according to identifier pages, each page is represented by a bitmap, each bit of the bitmap corresponds to a respective identifier value, and each bit value corresponds to the availability of the corresponding identifier, and the pointers to data in the index comprise at least a first pointer to a last page loaded by an identifier management unit of the system, and a second pointer to a last page updated by an update unit of the system, the computer program product comprising:

a non-transitory computer-readable storage medium; and
program code stored on the non-transitory computer-readable storage medium that, when executed by one or more processors, causes the one or more processors to:
load, by the at least one identifier management unit, a first identifier page, based on the first pointer;
allocate, by the at least one identifier management unit, an identifier of the identifier page to an object to be stored in the database, based on a bitmap corresponding to the first loaded page;
determine, by the at least one update unit, identifiers corresponding to a second identifier page based on the second pointer;
access, by the at least one update unit, the memory unit to check availability of the determined identifiers;
update, by the at least one update unit, a bitmap representing the second loaded page based on availability of the determined identifiers;
store, by the database in the memory unit, an object and its allocated identifier upon its activation in the system; and
delete, by the database from the memory unit, an object and its allocated identifier upon its deactivation in the system.

* * * * *